United States Patent
Hwang et al.

(10) Patent No.: US 10,683,392 B2
(45) Date of Patent: Jun. 16, 2020

(54) METHOD FOR PREPARING POLYETHERESTER COPOLYMER

(71) Applicant: LG CHEM, LTD., Seoul (KR)

(72) Inventors: Soo Hwan Hwang, Daejeon (KR); Seong Jae Shin, Daejeon (KR); Suk Yung Oh, Daejeon (KR); Jeong Seok Lee, Daejeon (KR); Mi Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 6 days.

(21) Appl. No.: 16/086,415

(22) PCT Filed: Sep. 29, 2017

(86) PCT No.: PCT/KR2017/011037
§ 371 (c)(1),
(2) Date: Sep. 19, 2018

(87) PCT Pub. No.: WO2018/062965
PCT Pub. Date: Apr. 5, 2018

(65) Prior Publication Data
US 2019/0127521 A1    May 2, 2019

(30) Foreign Application Priority Data
Sep. 29, 2016 (KR) .................. 10-2016-0125711

(51) Int. Cl.
| | | |
|---|---|---|
| *C08G 63/85* | (2006.01) | |
| *C08G 63/672* | (2006.01) | |
| *C08J 11/02* | (2006.01) | |
| *C08G 63/90* | (2006.01) | |

(52) U.S. Cl.
CPC ......... *C08G 63/85* (2013.01); *C08G 63/672* (2013.01); *C08G 63/90* (2013.01); *C08J 11/02* (2013.01); *C08J 2367/02* (2013.01)

(58) Field of Classification Search
USPC ................ 528/271, 272, 274, 279
See application file for complete search history.

(56) References Cited

FOREIGN PATENT DOCUMENTS

| | | |
|---|---|---|
| KR | 10-2001-0101755 A | 11/2001 |
| KR | 10-2005-0040830 A | 5/2005 |
| KR | 10-2009-0082362 A | 7/2009 |
| KR | 10-2012-0084597 A | 7/2012 |
| KR | 10-2014-0028493 A | 3/2014 |
| KR | 10-2014-0087245 A | 7/2014 |

*Primary Examiner* — Terressa Boykin
(74) *Attorney, Agent, or Firm* — Dentons US LLP

(57) ABSTRACT

The present invention relates to a method for preparing a polyetherester copolymer having excellent economical efficiency by recycling unreacted diol and excellent physical properties. Accordingly, the preparation method may prepare a polyetherester copolymer of high purity having excellent economical efficiency by purifying a byproduct to separate a recycle stream including unreacted diol therefrom, and reusing the recycle stream.

13 Claims, 2 Drawing Sheets

METHOD FOR PREPARING POLYETHERESTER COPOLYMER

CROSS-REFERENCE TO RELATED APPLICATIONS

This application is a National Stage Entry of International Application No. PCT/KR2017/011037, filed on Sep. 29, 2017, and claims the benefit of and priority to Korean Application No. 10-2016-0125711, filed on Sep. 29, 2016, all of which are hereby incorporated by reference in their entirety for all purposes as if fully set forth herein.

Technical Field

The present invention relates to a method for preparing a polyetherester copolymer having excellent economical efficiency by reusing unreacted diol and a low ratio of impurity.

BACKGROUND ART

A polyetherester copolymer has excellent flexibility and elastic recovery, thereby being used as a substitute for a conventional rubber material. In particular, a polyetherester copolymer has both characteristics of an elastic material that rubber has, and thermoplastic characteristics of an ordinary plastic material, thereby being a material widely used for an automobile part such as extrusion wire coating, a power transmission boot, a cooling water circulation tube, and the like, and for an electronic component material.

Such a polyetherester copolymer is usually prepared by transesterifying an acid component such as dicarboxylic acid and the like, diol such as butanediol and the like, and polyol such as polytetramethylene ether glycol and the like, and then by condensation polymerizing the same. The diol is used in excess compared with other raw materials during the transesterification reaction, and unreacted diol used in excess is separated out as a byproduct after the condensation polymerization reaction to be reused again as a raw material in the transesterification reaction.

At this time, the byproduct includes, in addition to the unreacted diol, various kinds of impurities generated during the reaction, for example, a low boiling point compound including a thermal decomposition product of diol, such as methanol, water, tetrahydrofuran and the like, and a high boiling point compound such as an oligomer.

The thermal decomposition product of diol such as waster, tetrahydrofuran, and the like may cause a problem of generating a bad odor in a copolymer finally prepared, or increasing the rate of a side reaction by causing the hydration of a reaction catalyst. The methanol is prepared when an acid component unconverted in the transesterification reaction is condensation polymerized, and may deteriorate the initial reactivity of the transesterification reaction. The oligomer of polyol is concentrated, and may increase the clogging of a condenser in an upper portion of a condensation polymerization reactor, and may cause a problem of deteriorating the viscosity characteristic when included in a large amount in the copolymer finally prepared. Therefore, the byproduct may cause various problems when reused intact as a reaction raw material of a transesterification reaction, thereby deteriorating the physical properties of the copolymer finically prepared, and deteriorating the productivity.

Therefore, in order to prevent the problems from occurring, it is necessary to separate and remove impurities included in a byproduct other than unreacted diol, especially a high boiling point compound, before reusing the byproduct as a reaction raw material.

Under the above circumstances, the present inventors completed the present invention capable of improving the processibility efficiency and economical efficiency of a copolymer finally prepared while not adversely affecting the physical properties thereof, by confirming that a high boiling point compound such as an oligomer of polyol which adversely affects a reaction device is included in a byproduct including unreacted diol, obtaining a recycle stream by separating and removing a low boiling point compound and a high boiling point compound included in the byproduct before reusing the byproduct, and reusing the recycle stream as a reaction raw material.

DISCLOSURE OF THE INVENTION

Technical Problem

The present invention was devised to solve the above mentioned problems of the prior art. An aspect of the present invention provides a method for preparing a polyetherester copolymer having excellent economical efficiency by reusing unreacted diol and a low ratio of impurity.

Technical Solution

According to an aspect of the present invention, there is provided a method for preparing a polyetherester copolymer, the method including: preparing an intermediate reaction product by transesterifying a reaction raw material including dicarboxylate, diol, and polyol in the presence of a reaction catalyst (Step 1); and separating and recovering a reaction product and a byproduct by subjecting the intermediate reaction product to a condensation polymerization reaction (Step 2), wherein the byproduct is purified to separate a recycle stream including unreacted diol therefrom such that the recycle stream is used as a reaction raw material for the Step 1), wherein the byproduct includes diol and an oligomer of polyol, and the oligomer of polyol is removed by the purification.

Advantageous Effects

A method for preparing a polyetherester copolymer according to an embodiment of the present invention may prepare may prepare a polyetherester copolymer of high purity having excellent economical efficiency by purifying a byproduct to separate a recycle stream including unreacted diol therefrom, and reusing the recycle stream.

BRIEF DESCRIPTION OF THE DRAWINGS

The following drawings attached to the specification illustrate preferred examples of the present invention, and serve to enable technical concepts of the present invention to be further understood together with the invention described above, and therefore the present invention should not be construed as being limited to the matters described in such drawings.

MODE FOR CARRYING OUT THE INVENTION

Figure 1:
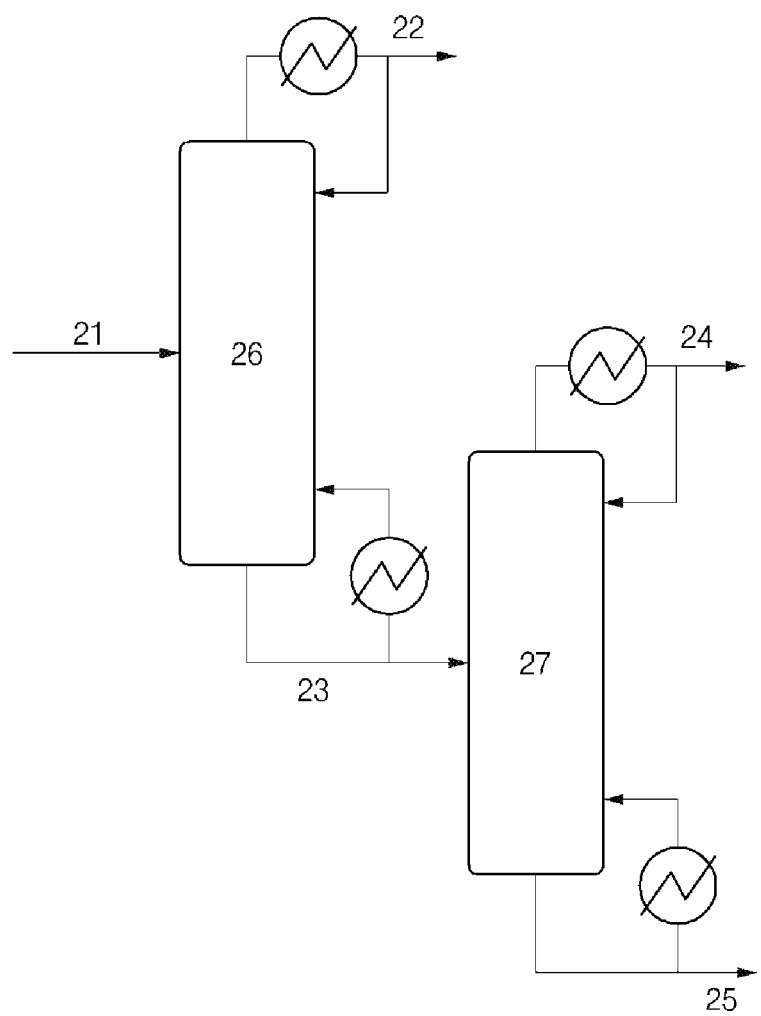
FIG. 1 schematically illustrates a purification system including a plurality of distillation columns according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method for preparing a polyetherester copolymer.

In a conventional method for preparing a polyetherester copolymer, diol is used in excess compared with dicarboxylate and polyol during a transesterification reaction in order to facilitate the reaction. As a result, a large amount of unreacted dior is left as a byproduct, which results in poor process efficiency and economical efficiency. Thus, the byproduct is recycled to be reused as a reaction raw material.

However, the byproduct product further includes, in addition to unreacted diol, impurities such as a low boiling point compound such as methanol, water, and tetrahydrofuran and the like, and a high boiling point compound such as an oligomer of polyol and the like, which may cause problems of generating a bad odor in a copolymer finally prepared, increasing the rate of a side reaction by causing the hydration of a reaction catalyst, deteriorating the initial reactivity of a transesterification reaction, increasing the clogging of a condenser in an upper portion of a condensation polymerization reactor, and deteriorating the physical properties, such as the viscosity characteristic, of the copolymer finically prepared.

Therefore, in order to prevent the problems from occurring, before reusing a byproduct as a reaction raw material, it is necessary to separate and remove impurities included in the byproduct other than unreacted diol, especially a high boiling point compound. However, since it is difficult to confirm the presence of the high boiling point compound, until recently, the presence of a high boiling point compound in a byproduct has not been recognized, thereby being reused as a reaction raw material mixed with unreacted diol when the byproduct is reused. Accordingly, an interruption of a process for washing a condenser in an upper portion of a reactor frequently occurs, and there are various problems in that the productivity and processibility of a final copolymer are deteriorated due to the deterioration of the characteristics of a copolymer itself.

Therefore, the present invention provides a preparation method capable of preparing a polyetherester copolymer of high purity, as well as improving the processibility efficiency and economical efficiency thereof by confirming that a high boiling point compound such as an oligomer of polyol is included in a byproduct including unreacted diol, obtaining a recycle stream by separating and removing a low boiling point compound and a high boiling point compound included in the byproduct before reusing the byproduct, and reusing the recycle stream as a reaction raw material.

The preparation method according to an embodiment of the present invention is characterized by: preparing an intermediate reaction product by transesterifying a reaction raw material including dicarboxylate, diol, and polyol in the presence of a reaction catalyst (Step 1); and separating and recovering a reaction product and a byproduct by subjecting the intermediate reaction product to a condensation polymerization reaction (Step 2), wherein the byproduct is purified to separate a recycle stream including unreacted diol therefrom such that the recycle stream is used as a reaction raw material for the Step 1), wherein the byproduct includes diol and an oligomer of polyol, and the oligomer of polyol is removed by the purification.

Step 1 is a step for preparing an intermediate reaction product by transesterifying dicarboxylate, diol, and polyol in the presence of a reaction catalyst.

In the transesterification reaction, dicarboxylate, diol, and polyol are not particularly limited, and may be used in a molar ratio suitable for the reaction. Specifically, the diol may be used in an equivalent ratio of 1 to 2 to the dicarboxylate. The polyol may be used in an equivalent ratio of 1 to 2 to the dicarboxylate. If the diol and the polyol are each used in a ratio exceeding the equivalent ratio, the molecular weight growth may be limited or the occurrence of a side reaction may be increased in the following condensation polymerization reaction, resulting in the deterioration of productivity.

The dicarboxylate is not particularly limited, but may be, for example, any one of dimethyl terephthalate, dimethyl isophthalate, and dimethyl naphthalate. Specifically, the dicarboxylate may be dimethyl terephthalate.

The diol is not particularly limited, but may be, for example, any one of 1,4-butanediol, monoethylene glycol, diethylene glycol, propylene glycol, and neopentyl glycol. Specifically, the diol may be 1,4-butanediol.

The polyol is not particularly limited, but may be, for example, any one of polytetramethylene ether glycol, polyethylene glycol, and polypropylene glycol. Specifically, the polyol may be polytetramethylene ether glycol.

In addition, the reaction catalyst may be used in an amount suitable for facilitating the transesterification reaction, and may be, for example, used in an amount of 0.001 parts by weight to 0.3 parts by weight based on the 100 parts by weight of a reaction raw material. At this time, when the reaction catalyst is used in an amount smaller than the range, the reaction rate becomes too slow so that the process efficiency may be deteriorated. When the reaction catalyst is used in excess, the color of a polyetherester copolymer finally prepared may be adversely affected. Here, the reaction raw material may include dicarboxylate, diol, and polyol.

The reaction catalyst is not particularly limited, but may be, for example, one or more selected from the group consisting of tetrabutyl titanate, tetraisopropyl titanate, tetraethyl titanate, tetra (2-ethylhexyl) titanate, and tetraisopropyl(dioctyl)phosphate titanate. Specifically, the reaction catalyst may be tetrabutyl titanate.

Also, the transesterification reaction may be performed while raising the temperature within a temperature range of 140° C. to 250° C. At this time, the transesterification reaction may be performed under atmospheric pressure. In addition, the transesterification reaction may be performed until the conversion rate reaches 80% or more, and specifically, until the conversion rate reaches 95% or more. If the transesterification reaction is performed at a temperature lower than the temperature range, a problem in which a reactant including dicarboxylate and diol is solidified may occur. If performed at a higher temperature, the occurrence of a side reaction may be increased. In addition, when the transesterification reaction is terminated before the conversion rate reaches 80%, the molecular weight growth may be limited in the following condensation polymerization reaction.

Step 2 is a step for preparing a polyetherester copolymer which is a reaction product, and a step for separating and recovering a polyetherester copolymer, which is a reaction product, and a byproduct, by subjecting the intermediate reaction product to a condensation polymerization reaction.

The condensation polymerization reaction is not particularly limited, but may be performed, for example, while raising the temperature within a temperature range of 200° C. to 270° C. under a pressure of 1 torr or less. If the condensation polymerization reaction is performed at a temperature higher than the temperature range, the occurrence of a side reaction may be increased so that the color characteristic of a polyetherester copolymer finally prepared may be deteriorated. If the pressure is higher than the range, the rate of condensation polymerization reaction may be slowed down so that the productivity may be deteriorated.

Meanwhile, a preparation method according to an embodiment of the present invention, as described above, may purify a byproduct separated and recovered from a reaction product after the condensation polymerization reaction to separate a recycle stream including unreacted diol therefrom, and may reuse the recycle stream as a reaction raw material in the transesterification reaction of Step 1. That is, a reaction raw material used in the transesterification reaction of Step 1 may include a recycle stream in addition to dicarboxylate, diol, and polyol, wherein the recycle stream may be used as a diol source material. Accordingly, the total amount of diol used in the transesterification reaction may be a sum of diol and unreacted diol included in a recycle stream.

The byproduct may include unreacted diol and an oligomer of polyol. The oligomer of polyol is a thermal decomposition product of polyol, and may be a cyclic oligomer having a degree of polymerization of 3 to 9. At this time, the byproduct may include 10 wt % to 30 wt % of the oligomer of polyol.

Also, the byproduct may further include a low boiling point compound in addition to unreacted diol and an oligomer of polyol, wherein the low boiling point compound may include water, tetrahydrofuran, and methanol.

Meanwhile, an oligomer of polyol and a low boiling point compound in the byproduct may be separated and removed from unreacted diol by the purification. That is, the oligomer of polyol and the low boiling point compound may be removed by purification, thereby not remaining in a recycle stream or present in a trace amount therein. Specifically, the recycle stream may include 96 wt % or more of unreacted diol.

At this time, the purification is not particularly limited, but may be performed using a distillation column. For example, the purification may be performed using a plurality of distillation columns in which a first distillation column and a second distillation column are connected in series, or using a single distillation column. If the purification is performed using a single distillation column, the recycle stream may be discharged from a middle portion in the height direction of the single distillation column.

Hereinafter, the purification will be described in detail with reference to FIGS. 1 and 2.

Figure 2:
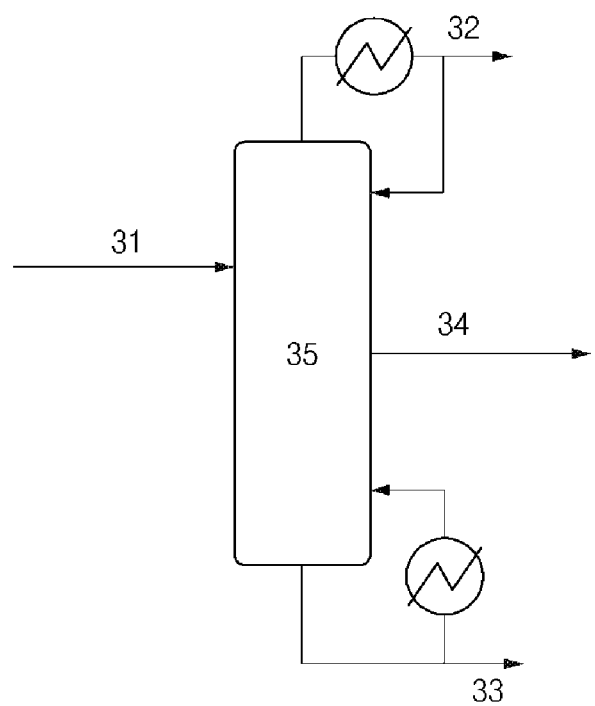
FIG. 2 schematically illustrates a purification system including a single distillation column according to an embodiment of the present invention.

FIGS. 1 and 2 schematically illustrate a purification system capable of performing the purification according to an embodiment of the present invention. FIG. 1 shows a purification system including a plurality of distillation columns in which a first distillation column and a second distillation column are connected in series, and FIG. 2 shows a purification system including a single distillation column.

Specifically, when the purification according to an embodiment of the present invention is performed using a purification system including a plurality of distillation columns as shown in FIG. 1, a byproduct is introduced into a first distillation column 26 through a byproduct flow line 21 so that a low boiling point compound is discharged from the top of the first distillation column 26 through a low boiling point compound discharge line 22, and the remainder of the byproduct except the low boiling point compound is transferred to a second distillation column 27 from the bottom of the first distillation column 26 through a byproduct discharge line 23. Thereafter, a recycle stream including unreacted diol is recovered from the top of the second distillation column 27 through a recycle stream recovery line 24, and an oligomer of polyol is discharged from the bottom of the second distillation column 27 through an oligomer discharge line 25.

Also, when the purification is performed using a purification system including a single distillation column as shown in FIG. 2, a byproduct is introduced into a single distillation column 35 through a byproduct flow line 31 so that a low boiling point compound is discharged from the top of the single distillation column 35 through a low boiling point compound discharge line 32, and a recycle stream including unreacted diol is discharged and recovered from the middle portion in the height direction of the single distillation column 35 through a recycle stream recovery line 34. An oligomer of polyol is discharged from the bottom of the single distillation column 35 through an oligomer discharge line 33.

At this time, low boiling point compounds discharged from the low boiling point compound discharge lines 22 and 32 may each have a boiling characteristic at a temperature of 25° C. to 95° C., specifically, 50° C. to 80° C., at a pressure of 0.1 bar to 2 bar. Oligomers of polyol discharged from the oligomer discharge lines 25 and 33 may each have a boiling characteristic at a temperature of 170° C. to 290° C., specifically, 200° C. to 270° C., at a pressure of 0.1 bar to 2 bar.

In the meantime, in the purification, the first distillation column 26, the second distillation column 27, and the single distillation column 35 are not particularly limited as long as each of them may smoothly perform the separation process described above. Specifically, in the first distillation column 26, the second distillation column 27, and the single distillation column 35, each top and bottom may independently have a pressure condition of 0.1 bar to 2 bar. If a pressure is higher than the range, unreacted diol and an oligomer of polyol may cause a side reaction, and if lower, the purification efficiency is deteriorated so that the ratio of unreacted diol in a recycle stream may be reduced, and the ratio of a low boiling point compound and an oligomer of polyol may be increased.

In addition, the present invention provides a polyetherester copolymer prepared by the preparation method described above.

Here, the polyetherester copolymer may be a block copolymer including a hard segment and a soft segment. The hard segment may be a unit derived from the diol described above, and the soft segment may be a unit derived from the polyol described above. Specifically, a polyetherester copolymer according to an embodiment of the present invention may be a polybutylene terephthalate-polytetramethylene terephthalate copolymer.

Hereinafter, the present invention will be described in further detail with reference to examples and experimental examples. However, the following examples and the experimental examples are provided to illustrate the present invention, and are not intended to limit the scope of the present invention.

PREPARATION EXAMPLE 1

100 kg of 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product, and a byproduct was recovered separated from the same.

The recovered byproduct was purified using a purification system as shown in FIG. 1 to obtain a recycle stream.

Specifically, the byproduct was introduced to the first distillation column 26 through the byproduct flow line 21 so that a low boiling point compound was discharged from the top of the first distillation column 26 through the low boiling point compound discharge line 22, and the remainder of the byproduct except the low boiling point compound was transferred to the second distillation column 27 from the bottom of the first distillation column 26 through the byproduct discharge line 23. Thereafter, an oligomer of polytetramethylene ether glycol was discharged from the bottom of the second distillation column 27 through the oligomer discharge line 25, and a recycle stream was recovered from the top of the second distillation column 27 through the recycle stream recovery line 24. At this time, the byproduct before the purification included 70 wt % of unreacted 1,4-butanediol, 12 wt % of a low boiling point compound (8 wt % of methanol, 2 wt % of water, and 2 wt % of tetrahydrofuran), and 18 wt % of an oligomer of polytetramethylene ether glycol, and the recycle stream recovered after the purification included 99.9 wt % of unreacted 1,4-butanediol. In addition, the pressure of the top of the first distillation column 26 was 1 bar, and the pressure of the bottom of the second distillation column 27 was 1.1 bar.

PREPARATION EXAMPLE 2

100 kg of 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product, and a byproduct was recovered separated from the same.

The recovered byproduct was purified using a purification system as shown in FIG. 2 to obtain a recycle stream.

Specifically, the byproduct was introduced into the single distillation column 35 through the byproduct flow line 31 so that a low boiling point compound was discharged from the top of the single distillation column 35 through the low boiling point compound discharge line 32, and an oligomer of polytetramethylene ether glycol was discharged from the bottom of the single distillation column 35 through the oligomer discharge line 33. A recycle stream including unreacted 1,4-butanediol was discharged and recovered from the middle portion in the height direction of the single distillation column 35 through the recycle stream recovery line 34. At this time, the byproduct before the purification included 70 wt % of unreacted 1,4-butanediol, 12 wt % of a low boiling point compound (8 wt % of methanol, 2 wt % of water, and 2 wt % of tetrahydrofuran), and 18 wt % of an oligomer of polytetramethylene ether glycol, and the recycle stream recovered after the purification included 96.6 wt % of unreacted 1,4-butanediol. In addition, the pressure of the top of the first distillation column 26 was 1 bar, and the pressure of the bottom of the second distillation column 27 was 1.1 bar.

PREPARATION EXAMPLE 3

100 kg of 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product, and a byproduct was recovered separated from the same.

The recovered byproduct was purified using a purification system as shown in FIG. 1 to obtain a recycle stream.

Specifically, the byproduct was introduced to the first distillation column 26 through the byproduct flow line 21 so that a low boiling point compound was discharged from the top of the first distillation column 26 through the low boiling point compound discharge line 22, and the remainder of the byproduct except the low boiling point compound was transferred to the second distillation column 27 from the bottom of the first distillation column 26 through the byproduct discharge line 23. Thereafter, an oligomer of polytetramethylene ether glycol was discharged from the bottom of the second distillation column 27 through the oligomer discharge line 25, and a recycle stream was recovered from the top of the second distillation column 27 through the recycle stream recovery line 24. At this time, the byproduct before the purification included 70 wt % of unreacted 1,4-butanediol, 12 wt % of a low boiling point compound (8 wt % of methanol, 2 wt % of water, and 2 wt % of tetrahydrofuran), and 18 wt % of an oligomer of polytetramethylene ether glycol, and the recycle stream recovered after the purification included 73.7 wt % of unreacted 1,4-butanediol. In addition, the pressure of the top of the first distillation column 26 was 3.0 bar, and the pressure of the bottom of the second distillation column 27 was 3.1 bar.

EXAMPLE 1

100 kg of sum of the recycle stream recovered in Preparation Example 1 and 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product.

EXAMPLE 2

100 kg of sum of the recycle stream recovered in Preparation Example 2 and 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product.

REFERENCE EXAMPLE 100 kg of 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product.

COMPARATIVE EXAMPLE 1

100 kg of sum of the byproduct of Preparation Example 1 and 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product.

COMPARATIVE EXAMPLE 2

100 kg of sum the recycle stream recovered in Preparation Example 3 and 1,4-butanediol, 200 kg of dimethyl phthalate, 200 kg of polytetramethylene ether glycol (molecular weight 1000 g/mol), and 0.8 kg of tetrabutyl titanate were introduced into a reactor, and while the temperature therein was raised from 140° C. to 200° C. for 2 hours, a transesterification reaction was initiated. When the conversion rate reached 95%, the reaction was terminated to obtain an intermediate reaction product. The obtained intermediate reaction product was then subjected to a condensation polymerization reaction at a pressure of 1 torr while the temperature was raised from 200° C. to 250° C. for 2.5 hours to obtain a polybutylene terephthalate-polytetramethylene terephthalate copolymer which is a reaction product.

EXPERIMENTAL EXAMPLE

During a condensation polymerization reaction of Example 1, Example 2, Reference Example, Comparative Example 1, and Comparative Example 2, the clogged state of a condenser in an upper portion of a reactor was observed with the naked eye, and a ratio of oligomer of polytetramethylene ether glycol in each prepared copolymer was measured. The results are shown in Table 1 below.

The ratio of oligomer in a polymer was obtained as follows: Each of the polymer was dissolved in a hexafluoroisopropanol solvent and then precipitated in methanol to obtain a supernatant. Then, the supernatant was filtered, and the kind of oligomer was qualitatively analyzed using LC-MSD (Acquity UPLC system, Xevo G2-S QTOF Mass detector, Waters). Based on the result of the qualitative analysis, a ratio of oligomer in each polymer was quantitatively analyzed using GC-MSD (7890C GC system, 5977A mass detector, Agilent).

TABLE 1

| Classification | Ratio of oligomer in copolymer (wt %) | Clogged state of condenser |
| --- | --- | --- |
| Example 1 | 1.36 | ○ |
| Example 2 | 1.65 | Δ |
| Reference Example | 1.35 | ○ |
| Comparative Example 1 | 2.42 | X |
| Comparative Example 2 | 2.85 | X |

○: Not clogged
Δ: State having no influence on a reaction process
X: State in which an interruption of a process is needed due to severe clogging As shown in Table 1, a copolymer prepared by the preparation method of polyetherester according to an embodiment of the present invention shows a similar ratio of oligomer when compared with a copolymer of Reference Example in which only the pure 1,4-butanediol was used instead of unreacted 1,4-butanediol, and at the same time, the polymerization reaction was completed without clogging the condenser in an upper portion of the condensation polymerization reactor.

On the contrary, a copolymer of Comparative Example 1 in which the byproduct was used intact, and a copolymer of Comparative Example 2 in which a recycle stream obtained by purifying the byproduct under the conditions out of the purification conditions proposed by the present invention was used, show a greatly increased ratio of oligomer in the copolymers. As a result, clogging occurred in the condenser in an upper portion of the condensation polymerization reactor.

The invention claimed is:
1. A method for preparing a polyetherester copolymer, the method comprising:

1) preparing an intermediate reaction product by transesterifying a reaction raw material including dicarboxylate, diol, and polyol in the presence of a reaction catalyst; and
2) separating and recovering a reaction product and a byproduct by subjecting the intermediate reaction product to a condensation polymerization reaction, wherein the byproduct is purified to separate a recycle stream including unreacted diol therefrom such that the recycle stream is used as a reaction raw material for the step 1), wherein the byproduct includes diol and an oligomer of polyol, and the oligomer of polyol is removed by introducing the byproduct into one or more distillation columns having a top and bottom pressure condition of 0.1 bar to 2 bar.

2. The method of claim 1, wherein the oligomer of polyol is a cyclic oligomer having a degree of polymerization of 3 to 9.

3. The method of claim 1, wherein the purification is performed using a plurality of distillation columns in which a first distillation column and a second distillation column are connected in series.

4. The method of claim 1, wherein the purification is performed using a single distillation column, and the recycle stream is discharged from a middle portion in the height direction of the single distillation column.

5. The method of claim 1, wherein the byproduct comprises 10 to 30 wt % of oligomer of polyol.

6. The method of claim 1, wherein the byproduct further comprises a low boiling point compound including water, tetrahydrofuran, and methanol, and the low boiling point compound is removed by the purification.

7. The method of claim 1, wherein the diol is used in an equivalent ratio of 1 to 2 with respect to dicarboxylate.

8. The method of claim 1, wherein the polyol is used in an equivalent ratio of 1 to 2 with respect to dicarboxylate.

9. The method of claim 1, wherein the recycle stream comprises 96 wt % or more of diol.

10. The method of claim 1, wherein the reaction catalyst is used in an amount of 0.001 parts by weight to 0.3 parts by weight based on the 100 parts by weight of the total amount of dicarboxylate, diol, and polyol.

11. The method of claim 1, wherein the reaction catalyst is one or more selected from the group consisting of tetrabutyl titanate, tetraisopropyl titanate, tetraethyl titanate, tetra (2-ethylhexyl) titanate, and tetraisopropyl(dioctyl)phosphate titanate.

12. The method of claim 1, wherein the transesterification reaction is performed while raising the temperature within a temperature range of 140° C. to 250° C.

13. The method of claim 1, wherein the condensation polymerization reaction is performed while raising the temperature within a temperature range of 200° C. to 270° C. under a pressure of 1 torr or less.

* * * * *